July 5, 1966  G. A. R. ÖJELID  3,259,830

PLURAL PHASE CONVERTER WITH VOLTAGE MULTIPLICATION

Filed Jan. 29, 1962

Inventor
Göran Axel Runo Öjelid
Cushman, Darby & Cushman
Attorneys

United States Patent Office 3,259,830
Patented July 5, 1966

3,259,830
PLURAL PHASE CONVERTER WITH VOLTAGE MULTIPLICATION
Göran Axel Runo Öjelid, Huskvarna, Sweden, assignor to Husqvarna Vapenfabriks Aktiebolag, Huskvarna, Sweden
Filed Jan. 29, 1962, Ser. No. 169,292
Claims priority, application Sweden, Feb. 2, 1961, 1,053/61
3 Claims. (Cl. 321—15)

This invention relates to a device for voltage conversion, particularly adapted for driving high frequency generators in apparatus for dielectric heating. Such devices of prior art are expensive and bulky, since they operate with a low pulse-frequency of the converted voltage.

The prime object of the invention is to provide an apparatus for simultaneously rectifying and increasing the voltage of a three-phase alternating current supply system in order to permit a CW magnetron to be driven from an alternating current supply system of a comparatively low voltage.

With this and other objects in view the device according to the invention is primarily characterized in that two capacitors each connected to one individual phase line are adapted to be charged through current valves to a multiple of the voltage of these phase lines with respect to the third phase line of an alternating current supply system, and in that said two capacitors are, through other current valves, connected to a third capacitor for charging the same to a higher multiple of said voltage.

Further objects and advantages of the invention will become more fully apparent from the following description and the accompanying drawing illustrating three preferred embodiments of the invention, and in which each figure represents a simplified circuit diagram according to the invention.

Figure 1:
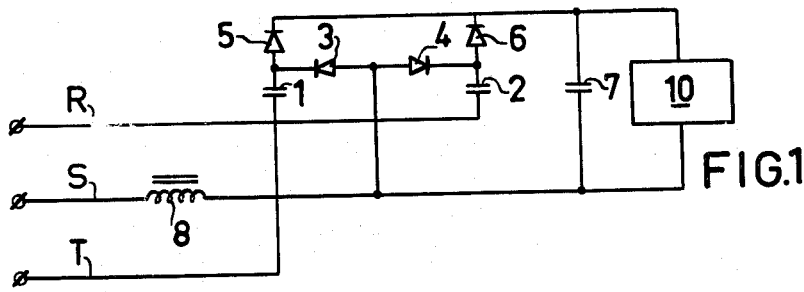
FIG. 1 shows a circuit for rectifying three phase alternating current with simultaneous increase in voltage.

The device according to FIGURE 1 comprises three capacitors 1, 2 and 7, which may be of the electrolytic type, four current valves 3, 4, 5 and 6, preferably of silicone type, a reactor 8 and a high frequency generator 10. The purpose of the device is to provide generator 10 with a voltage taken from the phase lines R, S, T of a three-phase alternating current supply system and rectified under simultaneous increase of its voltage, in order to make the generator continuously generate unattenuated electromagnetic oscillations of a very high frequency, e.g. for dielectric heating operations. The mode of operation is the following:

When line S has a positive voltage with respect to line T, the capacitor 1 is charged to the peak value of the voltage through valve 3. The same occurs with regard to capacitor 2 through valve 4 when line S gets a positive voltage with respect to line R. When, after that, line S gets a negative voltage with respect to line T during the next half cycle, this voltage appears in series with the remaining voltage of capacitor 1 and causes charging of capacitor 7 through valve 5 to a voltage nearly equal to two times the peak value of the voltage. In the same way capacitor 7 gets a charge supplied to it through valve 6 from capacitor 2 when line S assumes a negative voltage with respect to line R. Over capacitor 7 and generator 10 a direct voltage therefore will appear, which pulsates with the double frequency of the power supply system and is smoothed by capacitor 7 to a shape suitable for driving the generator 10. Reactor 8 operates to limit the current pulses through the valves, and it may also be dimensioned for stabilizing the generator current. If reactor 8 were dimensioned in such a way, that it together with capacitor 1 or 2 gives resonance for a frequency which is slightly higher than the frequency of the power supply system, the reactance which is increased at deacreasing generator current and therewith decreasing reactor current causes an approach of the resonance point to the frequency of the power supply system and therewith a compensating increase of the capacitor voltage.

Figure 2:
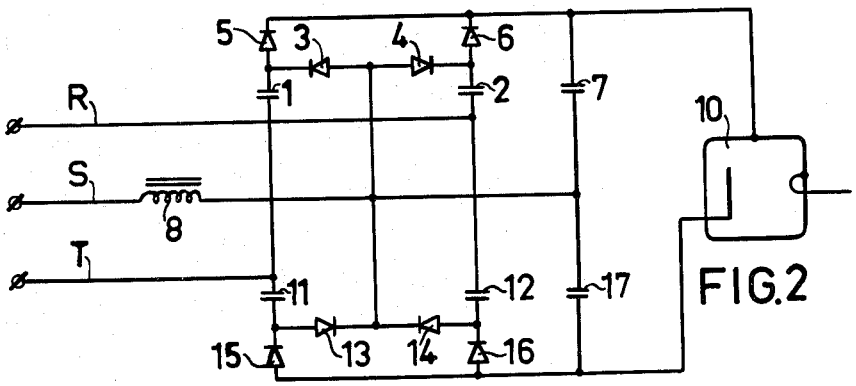
FIG. 2 shows a modification in which the output voltage is nearly four times the peak value of the supply voltage.

The device according to FIG. 2 is in principle a doubling of that according to FIG. 1, but the added part (11–17), in which each element is designated with the same reference numeral as the corresponding element in the upper portion (1–7) increased with 10, is adapted for the opposite polarity. This means that capacitors 7 and 17 through their common connection to phase line S are, with respect to their polarity, connected in series in relation to generator 10, and that a voltage may be taken out over them together, which is nearly four times the peak value of the voltage of the power supply system. The pulsation frequency is also four times the frequency of the power supply system. The high voltage and the high pulsation frequency makes the device very suitable for driving CW magnetrons at a high efficiency within the frequency range 1000–3000 mc.

Figure 3:
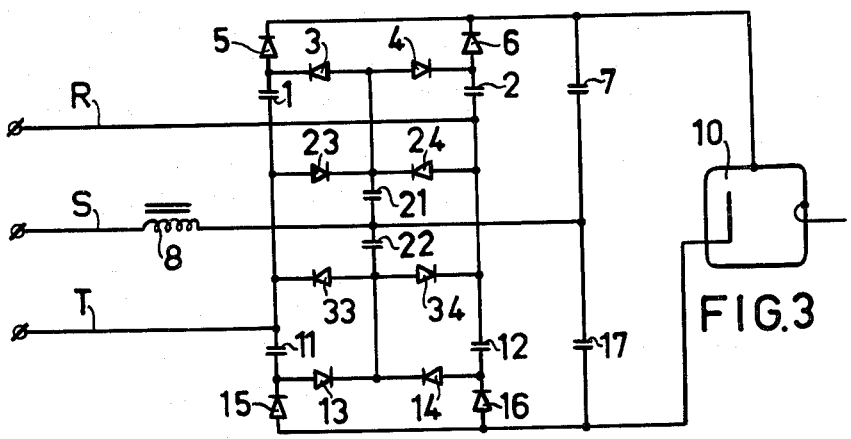
FIG. 3 shows a further modification.

In the device according to FIG. 3, in which the same reference numerals as in FIG. 2 have been employed to designate corresponding elements, two capacitors 21 and 22 are interconnected in the connection of phase line S with valves 3 and 4, and 13 and 14, respectively.

Between capacitor 21 and capacitors 1 and 2 two valves 23 and 24 are interconnected with the polarity shown in the drawing. Between capacitor 22 and capacitors 11 and 12 two valves are, in corresponding manner, interconnected with an opposite polarity with respect to valves 23 and 24.

In respect of the upper half of FIG. 3 and phases R and S, capacitor 21 becomes charged during a first half cycle, when R is positive in relation to S, approximately to the peak value of the voltage of the power supply system through the circuit R–24–21–8–S. During the following half cycle when R is negative in relation to S, capacitor 2 becomes charged approximately to the double peak value of the voltage of the supply system through the circuit S–8–21–4–2–R. During the next half cycle, when R is positive in relation to S, capacitor 7 becomes charged approximately to the third multiple of the peak value of the voltage of the supply system through the circuit R–2–6–7–8–S.

In respect of the lower half of FIG. 3 and phases R and S, capacitor 22 becomes charged during a first half cycle, when R is negative in relation to S, approximately to the peak value of the voltage of the power supply system through the circuit S–8–22–34–R. During the following half cycle when R is positive in relation to S, capacitor 12 becomes charged approximately to the double peak value of the voltage of the supply system through the circuit R–12–14–22–8–S. During the next half cycle, when R is negative in relation to S, capacitor 17 becomes charged approximately to the third multiple of the peak value of the voltage of the supply system through the circuit S–8–17–16–12–R.

In respect of the upper half of FIG. 3 and the phases T and S, capacitor 21 becomes charged during a first half cycle, when T is positive in relation to S, approximately to the peak value of the voltage of the power supply system through the circuit T–23–21–8–S. During the followering half cycle when T is negative in relation to S. capacitor 1 becomes charged approximately to the double peak value of the voltage of the supply system through the circuit S–8–21–3–1–T. During the next half cycle, when T is positive in relation to S, capacitor 7 becomes charged approximately to the third multiple of the peak value of the voltage of the supply system through the circuit T–1–5–7–8–S.

In respect of the lower half of FIG. 3 and the phases T and S, capacitor 22 becomes charged during a first half cycle, when T is negative in relation to S, approximately to the peak value of the voltage of the power supply system through the circuit S–8–22–33–T. During the following half cycle when T is positive in relation to S, capacitor 11 becomes charged approximately to the double peak value of the voltage of the supply system through the circuit T–11–13–22–8–S. During the next half cycle, when T is negative in relation to S, capacitor 17 becomes charged approximately to the third multiple of the peak value of the voltage of the supply system through the circuit S–8–17–15–11–T.

Since capacitors 7 and 17 are series connected in relation to generator 10, through their common connection to the phase line S, with respect to their polarity, a direct voltage, which is almost six times as great as the peak value of the voltage of the power supply system, may be taken out over these capacitors.

The pulsation frequency becomes equal to four times the frequency of the power supply system, also in this case. This very great increase of the voltage permits driving of CW magnetrons from a power supply system having a reduced voltage, e.g. 220 v.

While the invention has been particularly shown and described with reference to some preferred embodiments thereof, it will be understood by those skilled in the art that various changes in form and details may be made therein without departing from the spirit and scope of the invention.

What I claim is:

1. In apparatus for driving a load from a three phase alternating current supply system having first, second, and third phase lines, a voltage and frequency multiplier, comprising:
   an inductance in said first line, two condensers respectively in said second and third lines,
   a first pair of back-to-back connected unidirectional current conducting devices respectively coupled at their outer ends to the output sides of said condensers and at their inner ends in common to the output side of said inductance,
   a second pair of back-to-back connected unidirectional current conducting devices having their outer ends of polarity opposite the outer ends of said first pair and connected respectively to the said output sides of said condensers,
   a third condenser coupled between the connected inner ends of said second pair of unidirectional devices and the output side of said inductance, and
   means for connecting said load across said third condenser,
   the reactance of said inductance in conjunction with that of one of said two condensers being such as to effect resonance thereof at a frequency slightly higher than the frequency of said alternating current supply system.

2. In apparatus for driving a high frequency generator from a three phase alternating current supply system having first, second and third phase lines, a voltage quadruplifier, comprising:
   a first series circuit interconnected between said first and second phase lines of said supply system and including a first current valve and a first capacitor;
   a second series circuit interconnected between said first and second phase lines of said supply system and comprising a second current valve and a second capacitor,
      said second current valve being oppositely poled with respect to said first current valve;
   a third series circuit interconnected between said first and third phase lines of said supply system and including a third current valve and a third capacitor;
   a fourth series cricuit interconnected between said first and third phase lines of said supply system and including a fourth current valve and a fourth capacitor,
      said fourth current valve being oppositely poled with respect to said third current valve;
   a fifth series circuit interconnected between the junction of said first current valve and said first capacitor and said first phase line and including a fifth current valve and a fifth capacitor;
   a sixth series circuit interconnected between the junction of said second current valve and said second capacitor, and said first phase line and including a sixth current valve and a sixth capacitor,
      said sixth current valve being oppositely poled with respect to said fifth current valve;
   a seventh current valve interconnected between the junction of said third current valve and said third capacitor, and the junction of said fifth current valve and said fifth capacitor,
      said seventh current valve being similarly poled as said fifth current valve with respect to said fifth capacitor;
   an eighth current valve interconnected between the junction of said fourth current valve and said fourth capacitor, and the junction of said sixth current valve and said sixth capacitor,
      said eighth current valve being similarly poled as said sixth current valve with respect to said sixth capacitor, and
   means for connecting said load, said high frequency generator across said fifth and sixth capacitors in series with one another.

3. Apparatus as in claim 2 including in said first line an inductance having a reactance valve which in conjunction with that of one of said first, second, third and fourth capacitors effects resonance at a frequency slightly higher than the frequency of said alternating current system.

References Cited by the Examiner

"Radio Amateurs' Worksheet," CQ (June 1945), pp. 27–28.

LLOYD McCOLLUM, *Primary Examiner.*

MILTON O. HIRSHFIELD, G. H. GERSTMAN, M. L. WACHTELL, *Assistant Examiners.*